US006458193B1

(12) United States Patent
VanDahm

(10) Patent No.: US 6,458,193 B1
(45) Date of Patent: Oct. 1, 2002

(54) WASHABLE COLORING COMPOSITIONS

(75) Inventor: Richard A. VanDahm, Spartanburg, SC (US)

(73) Assignee: Milliken & Company, Spartanburg, SC (US)

( * ) Notice: Subject to any disclaimer, the term of this patent is extended or adjusted under 35 U.S.C. 154(b) by 0 days.

(21) Appl. No.: 09/571,184

(22) Filed: May 16, 2000

(51) Int. Cl.$^7$ .............................................. C09D 11/00
(52) U.S. Cl. ................. 106/31.32; 106/31.58; 106/31.64; 106/31.86
(58) Field of Search .................. 106/31.32, 31.58, 106/31.64, 31.86

(56) References Cited

U.S. PATENT DOCUMENTS

| | | | | |
|---|---|---|---|---|
| 3,449,319 A | | 6/1969 | Kuhn ........................ | 260/207.5 |
| 4,369,065 A | * | 1/1983 | Brixius ..................... | 106/31.35 |
| 4,738,725 A | * | 4/1988 | Daugherty et al. ...... | 106/31.64 |
| 4,822,417 A | * | 4/1989 | Kobayashi et al. ..... | 1106/31.35 |
| 4,988,123 A | * | 1/1991 | Lin et al. .................. | 106/31.64 |
| 5,043,013 A | | 8/1991 | Kluger et al. ............. | 106/31.32 |
| 5,116,410 A | | 5/1992 | Miller ...................... | 106/31.32 |
| 5,316,574 A | * | 5/1994 | Fujita et al. .............. | 106/31.64 |
| 5,324,764 A | * | 6/1994 | Fujita et al. .............. | 106/31.64 |

FOREIGN PATENT DOCUMENTS

| | | |
|---|---|---|
| EP | 0557115 A1 | 8/1993 |
| WO | 98/36032 | 8/1998 |

* cited by examiner

*Primary Examiner*—Helene Klemanski
(74) *Attorney, Agent, or Firm*—Terry T. Moyer; William S. Parks

(57) ABSTRACT

Washable coloring compositions comprising mixtures of specific low-molecular weight carboxylic acids and carboxylates are provided. Such mixtures are produced through the partial neutralization of a carboxylic acid by a base to provide a relatively neutral pH mixture comprising some acid and some carboxylate species. Such mixtures provide excellent washability enhancing performance in association with colorants and inks. Also, these specific mixtures exhibit low viscosities which allow for greater amounts of washability enhancing additive and colorant to be added within colorant and ink formulations while simultaneously permitting the mention of sufficiently low overall viscosities of the target compositions. Such mixtures provide highly effective prevention of permanent colorations to certain substrates, such as skin, clothing, and the like, by the inks, dyes, and the like, within the target compositions. Marker styluses, writing implements, and other colorant transfer devices, containing these inventive compositions, are also encompassed within this invention.

28 Claims, No Drawings

WASHABLE COLORING COMPOSITIONS

FIELD OF THE INVENTION

This invention relates to washable coloring compositions comprising mixtures of specific low-molecular weight carboxylic acids and carboxylates. Such mixtures are produced through the partial neutralization of a carboxylic acid by a base to provide a relatively neutral pH mixture comprising some acid and some carboxylate species. Such mixtures provide excellent washability enhancing performance in association with colorants and inks. Also, these specific mixtures exhibit low viscosities which allow for greater amounts of washability enhancing additive and colorant to be added within colorant and ink formulations while simultaneously permitting the retention of sufficiently low overall viscosities of the target compositions. Such mixtures provide highly effective prevention of permanent colorations to certain substrates, such as skin, clothing, and the like, by the inks, dyes, and the like, within the target compositions. Marker styluses, writing implements, and other colorant transfer devices, containing these inventive compositions, are also encompassed within this invention.

DISCUSSION OF THE PRIOR ART

All U.S. and foreign patents cited within this specification are hereby incorporated by reference. The term "washable coloring composition" in conjunction with this invention is intended to encompass marker compositions (such as large childrens' markers and slimmer felt-tip pens, as merely examples), paints, spray-pattern indicators, and other colored compositions which can be removed from certain surfaces through contact with water and/or with detergents.

Washable coloring compositions, such as within ink markers, were developed in the past in order to provide children with writing and/or coloring implements which may not permanently stain or discolor certain surfaces, most notably clothing and skin. Such washable ink marker compositions generally require water-soluble colorants which also have a low affinity for coloring skin, clothing, and other surfaces, but which exhibit much higher affinity for coloring paper substrates. Although water-soluble polymeric colorants are preferred, acid dyes are also well known color components of such marker compositions.

The washability of such compositions is generally dependent upon the nature of the colorants or dyes utilized, but such a characteristic can be substantially improved by the presence of certain washability enhancing additives within the marker formulation. Such enhancers are a class of compounds (including polymers) which enhance washability and removal of the colorants from undesirable surfaces. Without intending to be bound by any scientific theory, it is believed that these enhancers function by either interacting with potential "stain sites" on the substrate before the colorant or ink, or interacting with the colorant at its reactive sites, thereby preventing the reaction of the substrate with the highly reactive sites of the colorant. In the past, such compounds have included dye-blocking polyaromatic sulfonates and their salts, such as described in U.S. Pat. No. 5,116,410 to Miller, European Patent Application No. 557,115 A1 to Kaiser et al., and PCT Application No. WO 98/36032 to Santini et al. Such specific dye-blockers have proven somewhat useful in preventing permanent colorations on certain substrates; however, many (such as sulfonated phenol/formaldehyde condensation products) are highly colored and as such tend to have an adverse effect on the brightness of some shades of the target marker composition, producing a shade with a dull, dirty appearance. This problem is particularly noticeable with regard to lighter color shades. As a result, it has proven difficult to produce certain colored markers without requiring extra amounts of colorant, etc., to compensate for the interference from the dye-blocker compounds. Furthermore, many of the prior art dye-blocker compounds possess very high viscosities which, when incorporated within standard ink markers, translate into higher overall viscosities for those target formulations. Such marker compositions generally must exhibit a viscosity of below about 7.0 centipoise in order to function properly and permit adequate flow of the colorant composition through the marker nib of the stylus. In order to adjust the viscosity, it has been necessary to reduce the amount of dye-blocker compound present in the target composition, which, in turn, translates into a less effective washable marker composition. The greater amount of dye-blocker compound, the greater the ability to prevent discolorations of certain substrates. Thus, there is a need to provide a washability enhancing agent within washable marker formulations which can be utilized in high proportions and which does not deleteriously increase the viscosity of the target composition.

Furthermore, the great amount of prior art dye-blocker compounds within target marker compositions has limited the use of such compositions to those stored within relatively large marker styluses (such as childrens' markers). A washability enhancing compound which can be utilized in relatively high proportions to permit increased washability while simultaneously not deleteriously increasing the intrinsic viscosity of the target composition would provide a heretofore unknown advantage within the washable coloring composition art.

DESCRIPTION OF THE INVENTION

It is thus an object of the invention to provide a washability enhancing compound of low molecular weight and low viscosity which is compatible with inks, colorants, dyes, and the like. It is another object of this invention to provide a washability enhancing compound which can be added in effective proportions to a marker composition without increasing the viscosity to a deleteriously high amount for standard marker performance. A further object of the invention is to provide a washable marker comprising a marker composition that is easily removed from surfaces such as skin and clothing but exhibits a high affinity for standard writing surfaces, such as paper. Yet another object of this invention is to provide a relatively inexpensive and yet highly effective washability enhancement additive for use within washable colorant compositions.

The present invention encompasses specific molecular weight compounds which conform to the following structure (I):

wherein R is aliphatic (either linear, branched, cyclic, etc) and/or aromatic, n=1 to 4, and X is a counter-ion; and the aggregate number of carbon atoms within the structure is at most 22. The counter ion may be an alkali metal (such as sodium, potassium, and the like), hydrogen, ammonium, or an amine, wherein the pH of the composition is kept at a level from between about 5.5 and 9.0. The size of the aliphatic/aromatic radical, R, should be, at the most 21 carbons, preferably at most 18 carbons, preferably less than 12 carbons and most preferably 8 carbons or less. It has been found that the viscosity of the mixture becomes too great to provide effective washability enhancement once the aggregate carbon amount exceeds 22 in number, no matter what form the R group takes (i.e., whether an aromatic with multiple or long-chain moieties, or a highly branched aliphatic). Such a specific mixture of compounds, as a 20% aqueous solution, must also exhibit a viscosity of from about 1.0 to about 20 centipoise, preferably from about 1.5 to about 16, more preferably from about 1.5 to about 7, and most preferably from about 2 to about 6. Such mixtures, as aqueous solutions, although they may exhibit viscosities greater than the target 7.0 centipoise, are generally added to a coloring composition with a certain solids content. Upon introduction and mixing within the target compositions, the solutions are diluted and the overall viscosity of the resultant composition should be at most about 7.0 (if a marker composition is desired), although the final viscosity may be much higher if other types of washable coloring compositions are desired.

The pH level is of utmost importance to ensure the presence of both a carboxylate and its corresponding carboxylic acid. It has been found that this particular combination of acid/salt provides the desired washability enhancement characteristics. Thus, in order to provide a sufficient level of both acid and carboxylate, the pH must be at a relatively neutral level. Too acidic and the amount of carboxylate is too low to provide the desired effects; too high (basic) and the amount of acid will be too low as well. Thus, the range of from 5.5 to about 9.0 has been found to provide the necessary acid/salt combination in solution (as long as the general compound conforming with Formula (I) above is added to the target composition, and the pH is adjusted to the requisite level, then the combination of acid/salt will be provided in effective amounts to impart the desired washability enhancements). Preferably, this pH range is from about 6.0 to about 8.5; more preferably from about 6.5 to about 8.0; and most preferably, a neutral pH of from about 7.0 to about 8.0. Without being bound to any specific scientific theory, it is believed that the requisite pH level is dependent upon the structure of the individual compound itself. Thus, it has been found that the lower the pKa value for the compound, the higher the pH necessary to generate the requisite acid/carboxylate combination, and vice-versa.

Also without intending to be bound by any scientific theory, it is possible that such a mixture of acid and salt exhibits an affinity for undesirable writing surfaces (such as skin, clothing, and the like) greater than that of the colorants used, thus occupying sites where colorants might adhere. It is also possible that such a mixture of acid and salt exhibits an affinity for the colorants used greater than that of the undesirable writing surfaces (such as skin, clothing, and the like) preventing the colorants from adhering to these surfaces. In any event, this inventive mixture of low molecular weight carboxylic acids and carboxylates has proven to be an effective washability enhancing component to prevent permanent colorations (and to facilitate the removal of colorations) from undesirable writing surfaces (again, such as skin, clothing, and the like).

The low molecular weight is necessary in order to provide a low viscosity for the desired mixture. In fact, at very high concentrations, the viscosity of the inventive mixture remains rather low, particularly when introduced within a standard marker composition. Thus, greater amounts of such a washability enhancing mixture may be added to such marker compositions in order to provide increased stain prevention and/or removal, if necessary, without deleteriously increasing the viscosity of the entire marker composition. Such a capability has provided a marked improvement within the washable marker composition field. Additionally, the preferred washability enhancing mixture does not create a dulling effect within the different color shades produced by the target marker compositions. As such, there is no need for a manufacturer to compensate for any shade or color variations within the inventive washable coloring compositions. Thus, this washability enhancer provides a substantial benefit to the washable coloring composition art.

There have been no teachings, suggestions, or discussion within the pertinent prior art as to the utilization of the specific mixtures of carboxylic acid and carboxylates and conforming to the compound of structure (I), above. Accordingly, this invention encompasses a washable coloring composition comprising at least one coloring agent and further comprising at least one compound containing at most 22 carbon atoms and represented by the following structure (I)

$$R(CO_2X)_n \qquad (I)$$

wherein R is selected from the group consisting of an aliphatic moiety, an aromatic moiety, and a combination of an aliphatic moiety and an aromatic moiety; n is from 1 to 4; and X is selected from the group consisting of at least one alkali metal, amine, hydrogen, and any mixtures thereof, wherein the pH of said composition is from about 5.5 to about 9.0. Preferably, n is 1 or 2. Preferably, R is either a linear, branched, or cyclic aliphatic moiety, or an aromatic-containing moiety, and is more preferably a linear alkyl group having from 1 to 12 carbons or a cyclic alkyl group having from 6 to about 14 carbons. Specific mixtures of compounds conforming to this structure include, without limitation, but preferably, acetic acid/sodium acetate, octenyl succinic acid/sodium octenyl succinate, docenyl succinic acid/sodium dodecnyl succinate, phthalic acid/sodium phthalate, hexahydrophthalic acid/ sodium hexahydrophthalate, succinic acid/sodium succinate. Other possible combinations include, again, without limitation, adipic acid/adipate, citric acid/citrate, propionic acid/ propionate, and so on. The requisite amount of carboxylic acid present within the compound mixture is controlled through a relative neutralization step. Thus, a pH level of from about 5–8 will provide the desired and necessary acid presence for the inventive washability enhancing material to function properly. Addition of a strong base, such as, without limitation, but preferably, aqueous NaOH, aqueous KOH, and the like, will provide both the desired pH level (if added slowly, such as dropwise) as well as the necessary mixture of carboxylic acid and carboxylate.

Preferably, the coloring agent of the inventive compositions is selected from colorants, pigments, dyes, inks, and the like. Any type of such compounds may be utilized, including, but not limited to, polymeric colorants, such as in U.S. Pat. No. 5,043,013 to Kluger et al, and acid dyes, and the like. Generally, any such compound may be utilized as long as the inventive acid/salt mixture exhibits an affinity for undesirable writing surfaces (skin, clothing, etc.) greater than that exhibited by the coloring compound(s) for the same surfaces. Preferably, the coloring compound is a polymeric colorant, possessing a certain amount of polyoxyalkylene groups (such as ethylene oxide, propylene oxide, butylene oxide, glycidol, and the like). Preferably, these colorants have all EO groups, as these are more water-soluble, and thus more fugitive than longer chain groups, although combinations of EO and any of the others may be utilized as well. Preferably from about 2 to about 50 moles of alkyleneoxy groups are present on each separate polyoxyalkylene pendant group; more preferably from about 2 to 10 moles; and most preferably from about 2 to 6 moles. The term "polyoxyalkylene" is intended to encompass any pendant group which includes at least two alkyleneoxy moieties. Specific polymeric colorants preferred within this invention include the following types:

TABLE 1

TRIPHENYLMETHANE POLYMERIC COLORANTS

| Colorant Number | A | B |
|---|---|---|
| 01 | 27 EO DA | 27 EO DA |
| 02 | 10 EO DA | 10 EO DA |
| 03 | 6 EO DA | 6 EO DA |
| 04 | 4 EO DA | 4 EO DA |
| 05 | 35 EO | 35 EO |
| 06 | 20 EO | 20 EO |
| 07 | 15 EO | 15 EO |
| 08 | 12 EO | 12 EO |
| 09 | 10 EO | 10 EO |
| 10 | 8 EO | 8 EO |
| 11 | 6 EO | 6 EO |
| 12 | 4 EO | 4 EO |

TABLE II

DIAZO POLYMERIC COLORANTS HAVING POLAR GROUPS

| Colorant Number | A | B | C | D | E | FG |
|---|---|---|---|---|---|---|
| 13 | $SO_2N$ | H | H | Me | H | 10 EO |
| 14 | COONa | H | H | H | H | 20 EO DA |
| 15 | $SO_2Me$ | H | H | Cl | H | 10 EO DA |
| 16 | $SO_2Me$ | H | Cl | H | H | 20 EO |
| 17 | $SO_3Na$ | H | Cl | H | H | 20 EO |
| 18 | $SO_2NEt_2$ | H | OMe | H | H | 10 EO |
| 19 | $SO_2NEt_2$ | H | OMe | Me | H | 10 EO |
| 20 | $SO_2NEt_2$ | H | OMe | OMe | OMe | 12 EO |
| 21 | $SO_2NEt_2$ | H | OMe | OMe | OMe | 20 EO DA |

TABLE III

DIAZO POLYMERIC COLORANTS HAVING POLAR GROUPS (WITH DIFFERENT LINKING ATOMS)

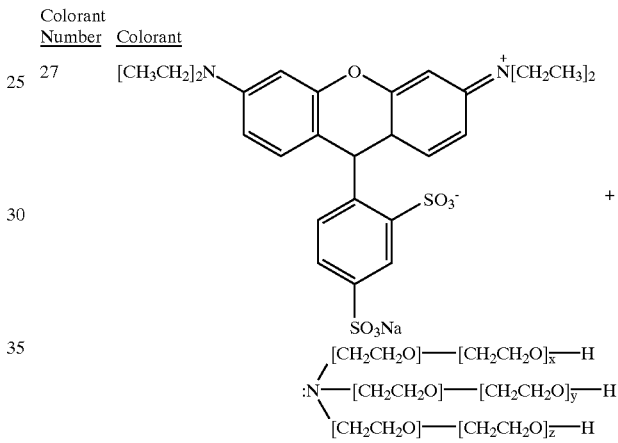

| Colorant Number | A | B | C | EO/PO |
|---|---|---|---|---|
| 22 | H | O | H | 30 EO |
| 23 | OH | O | H | 30 EO |
| 24 | H | $SO_2NH$ | Me | 3 PO/19 EO |
| 25 | OH | $SO_2NH$ | Me | 3 PO/19 EO |
| 26 | H | O | H | 10 EO |

Also preferred as polymeric colorants are the following in the same numeric order as above:

Colorant Number    Colorant

27 wherein x, y, and z are integers each >0 and the sum of x+y+z is at least 9, preferably at least 12, and, most preferably, at least 20.

28 A blend of Colorant #10 above and the following:

i)

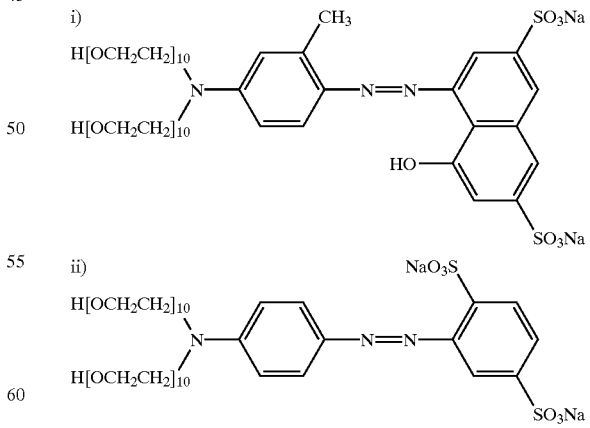

ii)

These colorants are, again, merely preferred poly (oxyalkylene) substituted dyes within the inventive composition, and this listing above is not intended to limit the scope of this invention. The colors produced by such polymeric colorants are bright and desirable. The chromophores produce an array of colors, such as blue, red, yellow, orange, scarlet, violet, magenta, and black, all in differing shades.

Furthermore, other dyes and pigments may be utilized or combined with the preferred polymeric colorants noted above. Thus, without limitation, acid dyes, solvent dyes, inks, carbon black, and the like may be utilized within the inventive compositions. Preferred are acid dyes, with specifically acid blacks more preferred.

Again, the inventive compositions comprising these colorants and the inventive washability enhancement additive are, as noted above, easily removed from various surfaces, such as skin, clothing, white boards, and the like. Furthermore, since these colorants are in liquid (aqueous) form, they do not precipitate out of solution. Their stability within felt-tip capillary action markers is superior to pigments since the presently utilized polymeric colorants do not settle to the bottom of a marker reservoir upon long-term vertical storage. These colorants remain in solution within such markers and thus will only lose colorability upon depletion of the colorants alone and not upon the storage of such markers in any position other than horizontal. Although such polymeric colorants are highly preferred, pigments, anionic dyes, and other non-polymeric colorants are also useful within and may be present either alone or in combination with the preferred polymerics.

The inventive washable colorant compositions also comprise standard components depending on the ultimate end use. Such end uses are myriad and include, without limitation, writing implements, such as markers, pens, and the like (such as in U.S. Pat. No. 6,031,023 to Carroll et al.), liquid household compositions, such as detergents, fabric softeners, cleaning fluids, and the like (such as in U.S. Pat. No. 5,770,552 to Bruhnke, U.S. Pat. No. 5,770,557 to Bruhnke, U.S. Pat. No. 5,773,405 to Bruhnke, and U.S. Pat. No. 5,935, 272 to Mahaffey), spray-pattern indicators for lawns, and the like (such as in U.S. Pat. No. 5,620,943 to Brendle); basically any coloring composition which may be applied or undesirably transferred to a certain substrate or surface is encompassed within the term "washable colorant composition." Most preferably, such compositions are placed within writing implements, such as markers. These specific marker compositions thus may include additives such as liquid carriers, including, and not limited to, water, lower alcohols (ethanol, methanol, and isopropanol, for example), glycol ethers, alkylene glycols, phenols, and the like. The compositions of this invention may comprise non-aqueous solvents (with no water present) as long as the colorant easily disperses within the solvent (such as ethanol and propylene glycol, as merely examples). Other components include humectants, such as, and not limited to, propylene glycol, glycerin, polyethylene glycol, and the like; film-forming polymer, such as polyvinyl pyrrolidone, polyvinyl acetate, sugars (such as, as merely examples, sorbitol, xylitol, and corn syrup), and the like; surfactants, such as, and not limited to, nonionics, such as ethoxylated dodecanol, anionics, such as phosphates, cationics, such as quaternary ammonium salts, and the like; and preservatives, such as, and not limited to, BHT, glutaraldehyde, formaldehyde, and the like. Such components are generally present in amounts (based upon the entire weight of the total composition) of from about 1 to about 30 percent by weight of at least one colorant, from about 20 to about 90 percent by weight of at least one liquid carrier, from about 5 to about 30 percent by weight of at least one humectant, from about 2 to about 30 percent by weight of at least one film-forming polymer, from about 0.1 to about 1.0 percent by weight of at least one surfactant, and from about 0.1 to about 1.0 percent by weight of at least one preservative. For particularly preferred marker compositions, such mixtures can be introduced within a marker stylus with a dispensing nib (such as a felt-tip, for example) which is then sealed and ready for use. The inventive compositions may also include other compounds such as, and not limited to, resins, pH adjusters, perfumes, chelating agents (such as EDTA), bactericides, fungicides, stabilizers, and the like. Additionally, polymer additives may be present, such as guar gum, polyethylene oxide, and cyclodextrin.

DESCRIPTION OF THE PREFERRED EMBODIMENTS

The preferred inventive compositions and color deposition systems are exemplified as follows:

Preparation of Washability Enhancers

EXAMPLE 1

17.1 parts of octenyl succinic acid were added to 72.7 parts of water while stirring. A 50% aqueous solution of sodium hydroxide was then added dropwise until the pH measured approximately 7.09 (for a total of about 10.2 parts NaOH).

EXAMPLE 2

14.6 parts of hexahydrophthalic anhydride were added to 72.5 parts of water while stirring. A 50% aqueous solution of sodium hydroxide was then added dropwise unto the pH measured approximately 7.02 (for a total of about 12.9 parts NaOH).

EXAMPLE 3

16.3 parts of dodecenyl succinic anhydride were added to 74.4 parts of water while stirring. A 50% aqueous solution of sodium hydroxide was then added dropwise until the pH measured approximately 7.93 (for a total of about 9.3 parts NaOH).

EXAMPLE 4

14.2 parts of phthalic anhydride were added to 71.1 parts of water while stirring. A 50% aqueous solution of sodium hydroxide was then added dropwise until the pH measured approximately 7.01 (for a total of about 14.7 parts NaOH).

EXAMPLE 5

14.7 parts of acetic acid were added to 65.9 parts of water while stirring. A 50% aqueous solution of sodium hydroxide was then added dropwise until the pH measured approximately 7.00 (for a total of about 19.5 parts NaOH).

EXAMPLE 6

14.6 parts of succinic acid were added to 65.9 parts of water while stirring. A 50% aqueous solution of sodium hydroxide was then added dropwise until the pH measured approximately 7.04 (for a total of about 19.5 parts NaOH).

Ink Composition Preparation and Testing

Ink compositions comprising the washability enhancers of EXAMPLES 1–6 as well as some of the preferred polymeric colorants listed above in TABLES I–IV were then produced through mixing together such compounds and other additives. The resultant ink compositions were then introduced within separate marker styluses and sealed. The ink compositions were made in accordance with the following Table V:

TABLE 1

Ink Compositions Comprising the Inventive Washability Enhancers

| Comp. # | Parts of Colorant (from TABLES above) | Parts of Enhancer (from) EXAMPLES above) | Glycerine | Deionized Water |
|---|---|---|---|---|
| 1 | 40 parts of Colorant 22 | 30 parts of EX. 1 | 5 parts | 25 parts |
| 2 | 40 parts of Colorant 22 | 30 parts of EX. 2 | 5 parts | 25 parts |
| 3 | 40 parts of Colorant 22 | 30 parts of EX. 3 | 5 parts | 25 parts |
| 4 | 40 parts of Colorant 22 | 30 parts of EX. 4 | 5 parts | 25 parts |
| 5 | 40 parts of Colorant 22 | 30 parts of EX. 5 | 5 parts | 25 parts |
| 6 | 40 parts of Colorant 22 | 30 parts of EX. 6 | 5 parts | 25 parts |
| 7 | 40 parts of Colorant 22 | — | 5 parts | 25 parts |
| 8 | 28.6 parts of Colorant 23 | 30 parts of EX. 1 | 5 parts | 36.4 parts |
| 9 | 28.6 parts of Colorant 23 | 30 parts of EX. 2 | 5 parts | 36.4 parts |
| 10 | 28.6 parts of Colorant 23 | 30 parts of EX. 3 | 5 parts | 36.4 parts |
| 11 | 28.6 parts of Colorant 23 | 30 parts of EX. 4 | 5 parts | 36.4 parts |
| 12 | 28.6 parts of Colorant 23 | 30 parts of EX. 5 | 5 parts | 36.4 parts |
| 13 | 28.6 parts of Colorant 23 | 30 parts of EX. 6 | 5 parts | 36.4 parts |
| 14 | 28.6 parts of Colorant 23 | — | 5 parts | 36.4 parts |
| 15 | 30 parts of Colorant 13 | 30 parts of EX. 1 | 5 parts | 35 parts |
| 16 | 30 parts of Colorant 13 | 30 parts of EX. 2 | 5 parts | 35 parts |
| 17 | 30 parts of Colorant 13 | 30 parts of EX. 3 | 5 parts | 35 parts |
| 18 | 30 parts of Colorant 13 | 30 parts of EX. 4 | 5 parts | 35 parts |
| 19 | 30 parts of Colorant 13 | 30 parts of EX. 5 | 5 parts | 35 parts |
| 20 | 30 parts of Colorant 13 | 30 parts of EX. 6 | 5 parts | 35 parts |
| 21 | 30 parts of Colorant 13 | — | 5 parts | 35 parts |
| 22 | 37.5 parts of Colorant 10 | 30 parts of EX. 1 | 5 parts | 27.5 parts |
| 23 | 37.5 parts of Colorant 10 | 30 parts of EX. 2 | 5 parts | 27.5 parts |
| 24 | 37.5 parts of Colorant 10 | 30 parts of EX. 3 | 5 parts | 27.5 parts |
| 25 | 37.5 parts of Colorant 10 | 30 parts of EX. 4 | 5 parts | 27.5 parts |
| 26 | 37.5 parts of Colorant 10 | 30 parts of EX. 5 | 5 parts | 27.5 parts |
| 27 | 37.5 parts of Colorant 10 | 30 parts of EX. 6 | 5 parts | 27.5 parts |
| 28 | 37.5 parts of Colorant 10 | — | 5 parts | 27.5 parts |
| 29 | 40 parts of Colorant 26 | 30 parts of EX. 1 | 5 parts | 25 parts |
| 30 | 40 parts of Colorant 26 | 30 parts of EX. 2 | 5 parts | 25 parts |
| 31 | 40 parts of Colorant 26 | 30 parts of EX. 3 | 5 parts | 25 parts |
| 32 | 40 parts of Colorant 26 | 30 parts of EX. 4 | 5 parts | 25 parts |
| 33 | 40 parts of Colorant 26 | 30 parts of EX. 5 | 5 parts | 25 parts |
| 34 | 40 parts of Colorant 26 | 30 parts of EX. 6 | 5 parts | 25 parts |
| 35 | 40 parts of Colorant 26 | — | 5 parts | 25 parts |
| 36 | 6 parts of Acid Black 2 | 30 parts of EX. 4 | 15 parts | 49 parts |
| 37 | 6 parts of Acid Black 2 | 30 parts of EX. 5 | 15 parts | 49 parts |
| 38 | 6 parts of Acid Black 2 | 30 parts of EX. 6 | 15 parts | 49 parts |
| 39 | 6 parts of Acid Black 2 | — | 15 parts | 49 parts |
| 40 | 4 parts of Acid Blue 9 | 30 parts of EX. 5 | 15 parts | 51 parts |
| 41 | 4 parts of Acid Blue 9 | 30 parts of EX. 6 | 15 parts | 51 parts |
| 42 | 4 parts of Acid Blue 9 | — | 15 parts | 51 parts |

Composition Numbers 7, 14, 21, 28, 35, 39, and 42 are Control Compositions with no Washability Enhancers present. All of these compositions provided excellent colorations on paper surfaces. The ink compositions were also tested for skin staining. The skin stain test required the following of the test subject:

1. The subject washed his hands with hand soap and warm water to remove substantially all residual oil and dirt.

2. The subject dried his hands thoroughly first with a towel and then by air drying.

3. The test composition (added to a sealed marker stylus) was then applied through the stylus nib to the palm of the subject's hand. One mark, approximately 2 inches long and ¼ of an inch wide was made for each composition. More colorant composition was applied through repeated drawings on the same line, when necessary, until each composition exhibited the same color intensity.

4. The marks were allowed to dry for fifteen minute and then rinsed under warm water to remove excess color.

5. The subject then washed his hand with soap and warm water for 30 seconds and then rinsed and dried his hand with a towel.

6. The remaining stains (if any) were then evaluated empirically on a scale of one to five both after the water rinse of Step 4 and the soap wash of Step 5.

The rating scale was as follows, with intermediates used as well:

| Rating | Comment |
|---|---|
| 0 | No visible stain |
| 1 | Very slight stain |
| 2 | Slight stain |
| 3 | Moderate stain |
| 4 | Heavy stain |
| 5 | No color removed |

The results for these tests as well as the viscosity measurements for the specific compositions were as follows:

TABLE VI

Viscosity and Skin Staining Test Results

| Comp. # | Viscosity (cps at 25° C.) | Skin Washability |
|---|---|---|
| 1 | 4.93 | 0.0 |
| 2 | 5.06 | 0.0 |
| 3 | 4.54 | 0.5 |

TABLE VI-continued

Viscosity and Skin Staining Test Results

| Comp. # | Viscosity (cps at 25° C.) | Skin Washability |
|---|---|---|
| 4 | 4.61 | 0.0 |
| 5 | 4.42 | 0.0 |
| 6 | 4.54 | 0.0 |
| 7 | 3.26 | 1.0 |
| 8 | 4.22 | 0.0 |
| 9 | 4.54 | 0.0 |
| 10 | 3.78 | 0.0 |
| 11 | 3.97 | 0.5 |
| 12 | 3.84 | 0.5 |
| 13 | 3.78 | 0.0 |
| 14 | 2.62 | 2.0 |
| 15 | 3.39 | 0.5 |
| 16 | 3.40 | 0.0 |
| 17 | 3.14 | 0.5 |
| 18 | 3.14 | 0.5 |
| 19 | 3.26 | 0.5 |
| 20 | 3.58 | 0.0 |
| 21 | 1.98 | 0.5 |
| 22 | 2.82 | 0.5 |
| 23 | 2.82 | 1.0 |
| 24 | 2.69 | 1.5 |
| 25 | 2.69 | 1.0 |
| 26 | 2.69 | 1.5 |
| 27 | 2.88 | 0.5 |
| 28 | 1.79 | 1.5 |
| 29 | 3.84 | 0.5 |
| 30 | 3.84 | 0.5 |
| 31 | 3.46 | 0.5 |
| 32 | 3.58 | 1.0 |
| 33 | 3.39 | 1.0 |
| 34 | 3.52 | 0.0 |
| 35 | 2.18 | 2.5 |

TABLE VII

Skin Staining Measurements for Compositions 36–45

| Composition Number | Skin Washability |
|---|---|
| 36 | 1.5 |
| 37 | 1.5 |
| 38 | 1.5 |
| 39 | 2.0 |
| 40 | 1.5 |
| 41 | 2.0 |
| 42 | 3.0 |

Clearly, the low molecular weight washability enhancer performed better than the control examples. Even with a relatively water-soluble colorant, the difference in stain removal is quite substantial.

There are, of course, many alternative embodiments and modifications of the present invention which are intended to be included within the spirit and scope of the following claims.

What I claim is:

1. A washable coloring composition comprising at least one coloring agent and further comprising at least two different compounds containing at most 22 carbon atoms and represented by the following structure (1)

$$R(CO_2X)_n \qquad (I)$$

wherein R is selected from the group consisting of an aliphatic moiety, an aromatic moiety, and a combination of an aliphatic moiety and an aromatic moiety; n is from 1 to 4; and X is selected from the group consisting of at least one alkali metal, ammonium, amine, and hydrogen; wherein the pH of said composition is from about 5.5 to about 9.0.

2. The composition of claim 1 wherein said coloring agent is selected from the group consisting of polymeric colorants, dyes, pigments, and any combination thereof.

3. The composition of claim 1 wherein n is 1 or 2 and the pH is from about 6.0 to about 8.5.

4. The composition of claim 3 wherein the pH is from about 6.5 to about 8.0.

5. The composition of claim 4 wherein the pH is from about 7.0 to about 8.0.

6. The composition of claim 1 wherein R is selected from the group consisting of a linear, branched and cyclic alkyl moiety.

7. The composition of claim 6 wherein R is selected from the group consisting of linear alkyl moieties having from 1 to about 18 carbons.

8. The composition of claim 2 wherein n is 1 or 2 and the pH is from about 6.0 to about 8.5.

9. The composition of claim 8 wherein said coloring agent is selected from the group consisting of at least one polymeric colorant, at least one acid dye, and any mixtures thereof.

10. The composition of claim 9 wherein said coloring agent is at least one polymeric colorant.

11. The composition of claim 8 wherein said coloring agent is selected from the group consisting of polymeric colorants, dyes, pigments, and any combination thereof.

12. The composition of claim 11 wherein said coloring agent is a polymeric colorant.

13. The composition of claim 4 wherein said coloring agent is selected from the group consisting of polymeric colorants, dyes, pigments, and any combination thereof.

14. The composition of claim 13 wherein said coloring agent is a polymeric colorant.

15. A writing implement comprising the composition of claim 1.

16. A writing implement comprising the composition of claim 2.

17. A writing implement comprising the composition of claim 3.

18. A writing implement comprising the composition of claim 4.

19. A writing implement comprising the composition of claim 5.

20. A writing implement comprising the composition of claim 6.

21. A writing implement comprising the composition of claim 7.

22. A writing implement comprising the composition of claim 8.

23. A writing implement comprising the composition of claim 9.

24. A writing implement comprising the composition of claim 10.

25. A writing implement comprising the composition of claim 11.

26. A writing implement comprising the composition of claim 12.

27. A writing implement comprising the composition of claim 13.

28. A writing implement comprising the composition of claim 14.

* * * * *